(12) United States Patent
Aytur et al.

(10) Patent No.: US 7,206,557 B2
(45) Date of Patent: Apr. 17, 2007

(54) METHOD AND APPARATUS FOR SUPPRESSING LOCAL OSCILLATOR LEAKAGE IN A WIRELESS TRANSMITTER

(75) Inventors: Turgut Sefket Aytur, Plattsburg, NY (US); Nathan Belk, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 494 days.

(21) Appl. No.: 10/338,198

(22) Filed: Jan. 8, 2003

(65) Prior Publication Data

US 2004/0132424 A1 Jul. 8, 2004

(51) Int. Cl.
*H04B 1/04* (2006.01)

(52) U.S. Cl. ...................... 455/118; 455/103; 455/126; 375/297; 375/296

(58) Field of Classification Search ................ 375/297, 375/296, 285; 330/149; 455/126, 118, 103
See application file for complete search history.

(56) References Cited

U.S. PATENT DOCUMENTS

| | | | | |
|---|---|---|---|---|
| 5,812,947 A | * | 9/1998 | Dent | 455/63.1 |
| 5,848,060 A | * | 12/1998 | Dent | 455/103 |
| 5,903,823 A | * | 5/1999 | Moriyama et al. | 455/126 |
| 6,091,941 A | * | 7/2000 | Moriyama et al. | 375/297 |
| 6,298,096 B1 | * | 10/2001 | Burgin | 375/296 |
| 6,327,464 B1 | | 12/2001 | Hayasaka | |
| 7,075,489 B2 | * | 7/2006 | Takaoka et al. | 455/118 |
| 2001/0039182 A1 | | 11/2001 | Atkinson | |
| 2001/0041546 A1 | | 11/2001 | Kazakevich | |
| 2001/0053671 A1 | | 12/2001 | Friedlander et al. | |
| 2002/0071506 A1 | | 6/2002 | Lindquist et al. | |
| 2003/0173984 A1 | * | 9/2003 | So | 375/285 |
| 2003/0185292 A1 | * | 10/2003 | Fernandez-Corbaton et al. | 375/297 |

* cited by examiner

*Primary Examiner*—Lana Le (57) ABSTRACT

A direct conversion transmitter comprising two local oscillators, an in-phase and quadrature modulating signal and in-phase and quadrature modulators, adds a leakage detector and corrective algorithm with one or more digital to analog converters to generate a corrective signal. The corrective signal corrects for, minimizes, and suppresses local oscillator carrier leakage into the transmitted signal. In accordance with the invention, direct up transmitter carrier leakage is automatically measured at regular intervals during the transmit cycle. A DC correction, or a correction waveform as a function of time, is input to both the "in-phase" and "quadrature" modulators at the baseband input. The two correction signals are tuned according to a minimization algorithm to achieve the lowest possible carrier component in the spectral output of the transmitter at its ambient operating conditions and present power output level. As the ambient conditions, such as temperature, and transmitter power level changes, the two correcting input DC currents, or correction waveforms, are further tuned towards the optimal values for that operating condition. Optimization is accomplished by an adaptive feedback technique employed to achieve maximum carrier suppression.

9 Claims, 6 Drawing Sheets

FIG. 1

Prior Art

FIG. 2

Prior Art

Prior Art

METHOD AND APPARATUS FOR SUPPRESSING LOCAL OSCILLATOR LEAKAGE IN A WIRELESS TRANSMITTER

FIELD OF THE INVENTION

This invention relates to wireless transmitters, and in particular to direct conversion wireless transmitters that provide carrier suppression by minimization of local oscillator leakage.

BACKGROUND OF THE INVENTION

Wireless transmitters are important components in modern communications systems. Wireless transmitters provide modulated radio waves to carry (transmit) data signals from one place to another. Modulation is the process of placing the data signals on the radio wave for transmission. The waves can be frequency modulated (FM, as in FM broadcast radio), amplitude modulated (AM, as in AM broadcast radio), phase modulated (PM), or modulated in other ways known in the art (e.g. frequency shift keying (FSK) or single sideband (SSB)).

Direct conversion wireless transmitters, also known as direct up transmitters, are relatively simple and inexpensive compared to other types of transmitters. Their simplicity and low cost are largely due to the fact that they require fewer components. Direct conversion transmitters generate a transmitted wave with a center frequency (carrier) and small regions of frequencies above and below the carrier (sidebands) that contain the modulated information. In direct conversion transmission, the information resides in the relatively higher power sidebands, and the carrier ends up with little power. This increases the transmission power efficiency and makes a battery last longer.

Direct conversion transmitters have local oscillators, modulating signals, mixers, summers, and amplifiers. The local oscillators generate radio frequency (RF) signals at the transmitter output frequency. The modulating signals contain the information to be transmitted. The mixers electrically combine the modulating signals with the local oscillator signals to create a modulated RF signal. Amplifiers increase the amplitude or strength of signals. Low frequency amplifiers are used to amplify the modulating signals, while high frequency RF amplifiers are needed to amplify modulated radio signals. Summing circuits add two signals to generate a sum signal.

The local oscillators create signals that are at the carrier frequency. During the direct conversion modulation process, the carrier power is reduced to a minimal level, that is the carrier is suppressed. All that remains are the information carrying sidebands. While theoretically it is possible to completely eliminate the carrier power, it is not easy to do with real world local oscillator circuits. In fact, it is quite difficult to suppress the carrier because of various local oscillator circuit errors. These errors change over time and temperature. The local oscillator errors cause the transmitter to emit power at the carrier frequency. The undesired power at the carrier frequency is called local oscillator leakage and reduces the performance of the transmitter. Accordingly, there is a need for direct up circuit topologies that can further reduce and minimize local oscillator leakage.

SUMMARY OF THE INVENTION

In accordance with the invention, a direct conversion transmitter comprises two local oscillators, an in-phase and quadrature modulating signal and in-phase and quadrature modulators, adds a leakage detector and a corrective algorithm with two digital to analog converters to generate corrective signals. The corrective signal corrects for, minimizes, and suppresses local oscillator carrier leakage into the transmitted signal.

Direct up transmitter carrier leakage is automatically measured at regular intervals during the transmit cycle. A DC correction, or a correction waveform as a function of time, is input to both the "in-phase" and "quadrature" modulators at the baseband input. The two correction signals are tuned according to a minimization algorithm to achieve the lowest possible carrier component in the spectral output of the transmitter at its ambient operating conditions and present power output level. As the ambient conditions, such as temperature, and transmitter power level, change the two correcting input DC currents or correction waveforms are further tuned towards the optimal values for that operating condition. Optimization is accomplished by an adaptive feedback technique employed to achieve maximum carrier suppression.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that the drawings are for the purpose of illustrating the concepts of the invention, and except for the graphs, are not to scale.

DESCRIPTION

The simplest view of direct conversion, also known in the art as "direct up", is a radio frequency (RF) carrier $Sin(\omega t)$ modulated by a modulating signal $x(t)$, also known as the baseband signal. In early AM modulation schemes, $x(t)$ was a signal with some relatively small audio bandwidth of about 20–30 kHz for audio transmission. By contrast, today's wireless modulation bandwidth requirements typically range from 1 to 5 MHz. And, RF carrier frequencies of current interest range from 50 MHz to over 5 GHz.

Another characteristic of today's direct up transmitters is that they use a suppressed carrier modulation scheme. This is accomplished by constructing a direct up topology, as known in the art, that sums modulated direct up quadrature components before final RF amplification by an RF power amplifier (PA). The quadrature components comprise an in-phase signal and a quadrature signal. The quadrature signal is typically the same magnitude as the in-phase signal, but delayed by 90 degrees in-phase.

Modern transmitter standards, such as the cellular phone standards CDMA 2000 and UTMS, require that the RF carrier be suppressed below the power of the spectrum of the data loaded signal. Typical suppression requirements are −15 dB as compared to the peak power of the data transmission sidebands. Also, according to modern cellular telephone standards, the cellular base station can remotely control the power output of the user's telephone transmitter. In fact the wireless transmitter's power can be controlled over a very wide range of as much as 50 dB to 70 dB. The purpose of base station remote power control of user transmitters is to balance all signals to approximately the same power level at the cell towers for optimal signal isolation and efficient signal processing.

One drawback of direct up topologies is that the transmitter's local oscillator (the unmodulated RF carrier frequency) "leaks" into the transmitter output when the modulating signal x(t) is at zero amplitude. This is caused by DC offsets in the modulation and mixer circuitry and other electronic imbalances and errors in the mixer circuit. Direct up transmitters typically have been designed with offset adjustments to reduce local oscillator leakage to a minimum. The adjustment is generally made during production line assembly and testing of the transmitters.

At high power output levels, the local oscillator leakage into the final PA is usually not problematic. This is because at high power output, the ratio of the high power in the data loaded sidebands is much higher (a ratio well above that typically required for 15 dB of carrier attenuation).

Wireless transmitters typically require power control circuitry. Variable gain RF power amplifiers can be used for power control, but they are costly and difficult to design. Thus, there is a motivation to control the gain of direct up transmitters at the lower baseband frequencies. For instance, at the relatively low frequencies of baseband as compared to the RF transmit frequency, OpAmp circuits utilizing feedback can be employed. But, because of low open loop gain at higher frequencies, OpAmp circuits are generally not suitable at the RF frequencies typically used by wireless transmitters. Low frequency power control circuits can be built at lower cost, and provide higher reliability, more accuracy, and exhibit wider dynamic range than their RF counterparts. At lower output power, however, the local oscillator leakage can become particularly problematic with baseband power control.

For example, when the base station turns down the power of the user's transmitter, the ratio between the data loaded signal and the oscillator leakage component becomes smaller. This is because with baseband power control, the leakage power is roughly constant (to an order of magnitude) over the transmitter's range of power output. But, at lower ranges of transmitter power output, that ratio can easily become unacceptable (when the carrier emission is less than 15 dB below the average power level of the intended data loaded spectral components of the transmitter's output spectrum).

Figure 1:
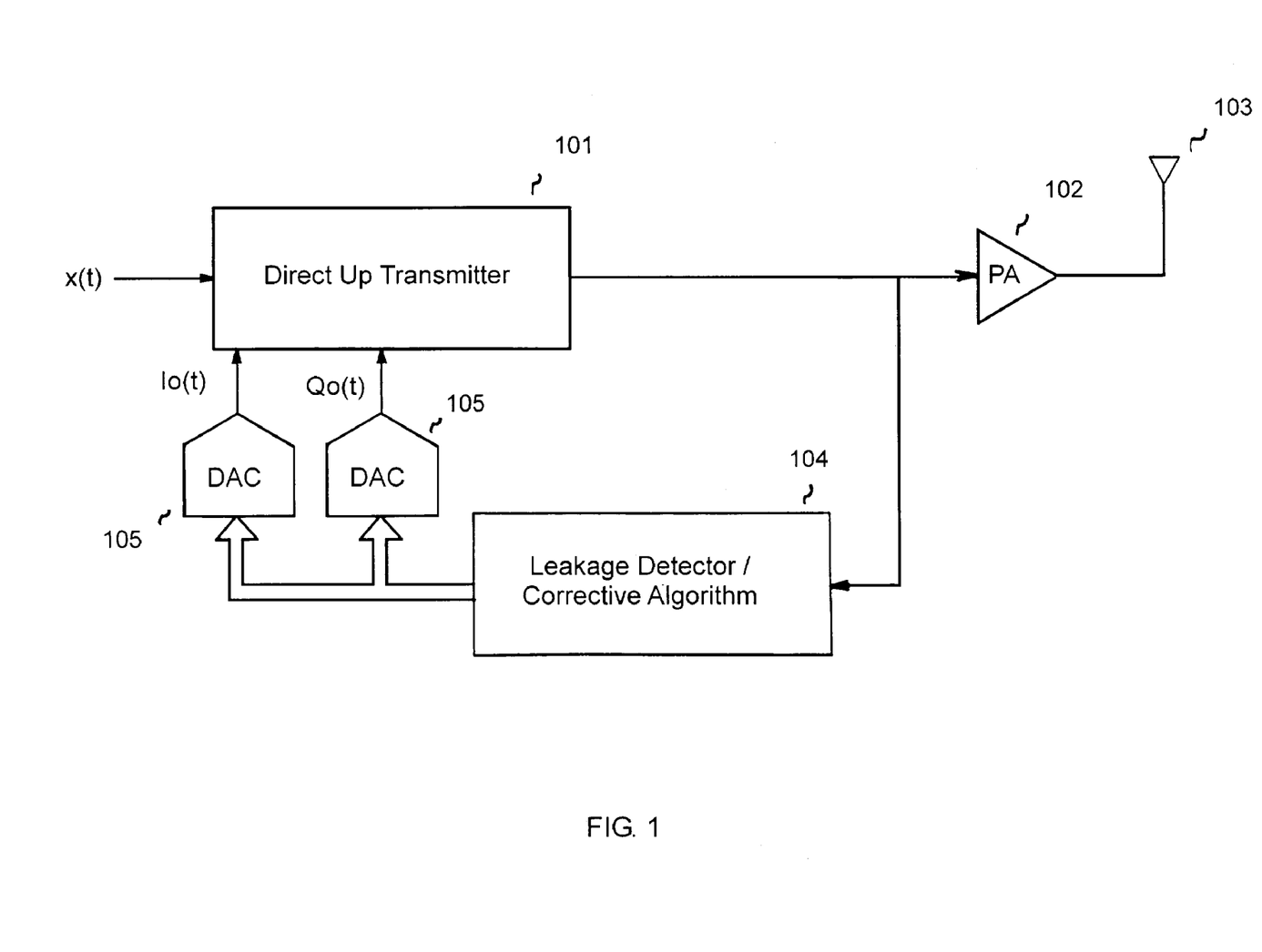
FIG. 1 is a simplified block diagram showing the adaptive feedback circuit topology of the invention.

FIG. 1 shows a simplified block diagram of the inventive technique to optimize carrier suppression. Direct Up transmitter 101, power amplifier 102, and antenna 103 are components of a direct up wireless transmitter system. A portion of the RF signal, typically from before the final power amplifier 102 (PA), is fed to a leakage detector within the leakage detector/corrective algorithm block 104. The leakage detector measures the magnitude of the local oscillator carrier that undesirably leaked through the direct up transmitter 101 to the output. The leakage detector can be a narrow band filter (narrower than the full bandwidth of the data loaded signal, but wide enough to detect the carrier component), or can advantageously use the existing receive circuitry in a wireless transceiver. A transceiver is a combination transmitter and receiver in one system and the receiver would otherwise be dormant during the transmit cycle.

The corrective algorithm of the leakage detector/corrective algorithm block 104 is stored in computer memory, typically in read only memory (ROM) and runs on a digital processor. ROM is used here to refer to any form of non-volatile memory including, electrically erasable (EEPROM), electrically programmable (EPROM), and one time programmable (OTPROM). The algorithm, also stored in ROM, tunes a corrective signal. The corrective signal is then summed with the modulating signal x(t) to minimize leakage. Various embodiments of the measuring cycle and corrective methods are described later in more detail. The in-phase and quadrature corrective signals are generated by the digital to analog converters (DAC) 105. The signals can be DC levels or voltages as a function of time that 'play' during the transmission of a data frame.

Figure 6:
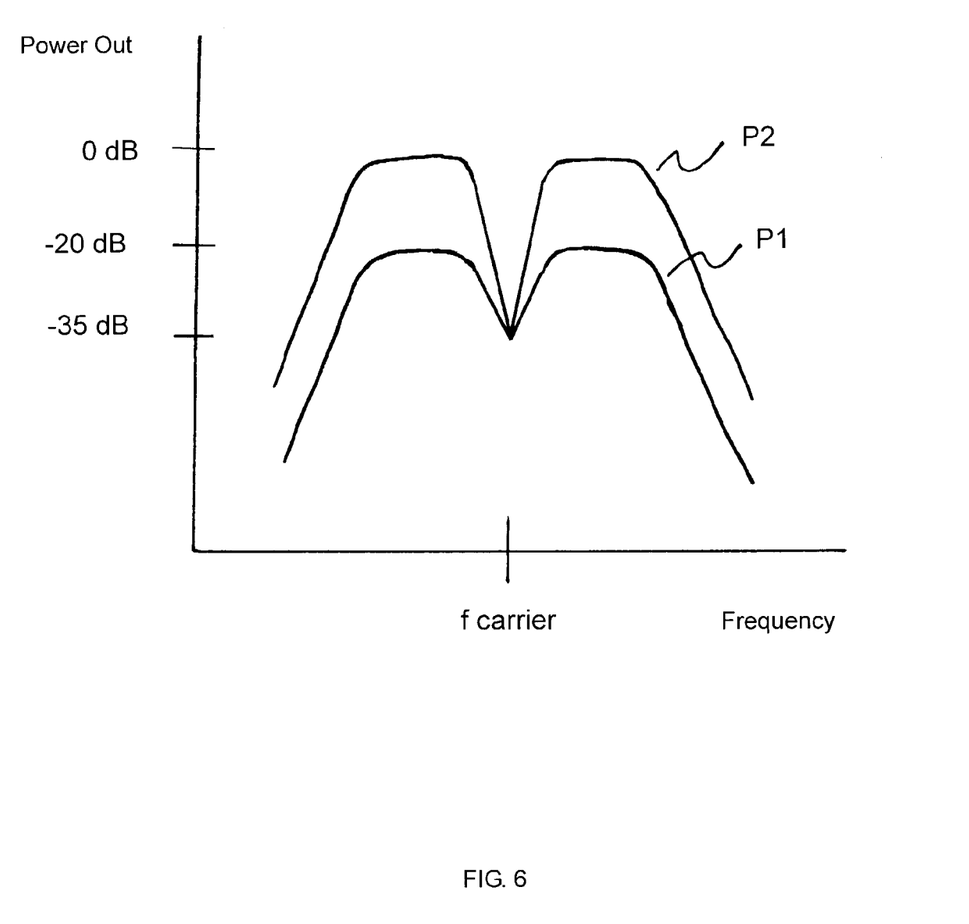
FIG. 6 shows the separation in power levels between the data sidebands and the carrier for two power output levels.

In order to better understand the need for the suppression of local oscillator leakage, consider the desired transmission spectrum for direct up wireless transmission. FIG. 6 shows the carrier suppressed output of a hypothetical direct up transmitter at two power output levels $P_2$, and $P_1$. This is a plot of wireless transmitter power output versus frequency (about the center carrier frequency). As can be seen by the relative power output levels, signal $P_2$ has an average power output of 0 dB across the data loaded sidebands and the carrier frequency $f_c$ is suppressed by 35 dB. The −35 dB carrier power is due to undesirable carrier leakage from the local oscillators through the mixers. Since the leakage is typically not a strong function of output power (although there is some dependence), the transmitter output power can be reduced by 20 dB ($P_1$) and still maintain the desired 15 dB of separation of power in the sidebands as compared to the suppressed carrier. But, if the transmitter's power was reduced any further than −20 dB in this example, the power at $f_c$ would no longer meet specification as it would be less then 15 dB down from the average power of the sidebands.

In other words the direct up transmitter of the preceding example is only capable of 20 dB of baseband power control while meeting a specification that requires that the power of the suppressed RF carrier be 15 dB below the desired sideband signal. The performance of the transmitter in the previous example is decidedly inferior to transmitters that need to meet modern requirements calling for useable power ranges as high as 50 to 70 dB.

Direct UP Topology

Figure 2:
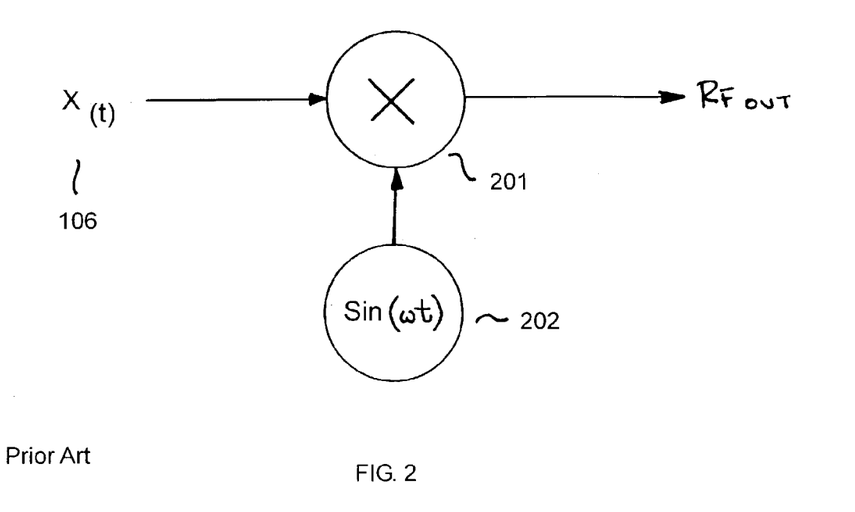
FIG. 2 is a block diagram of the simplest form of direct up according to the prior art.
Figure 3:
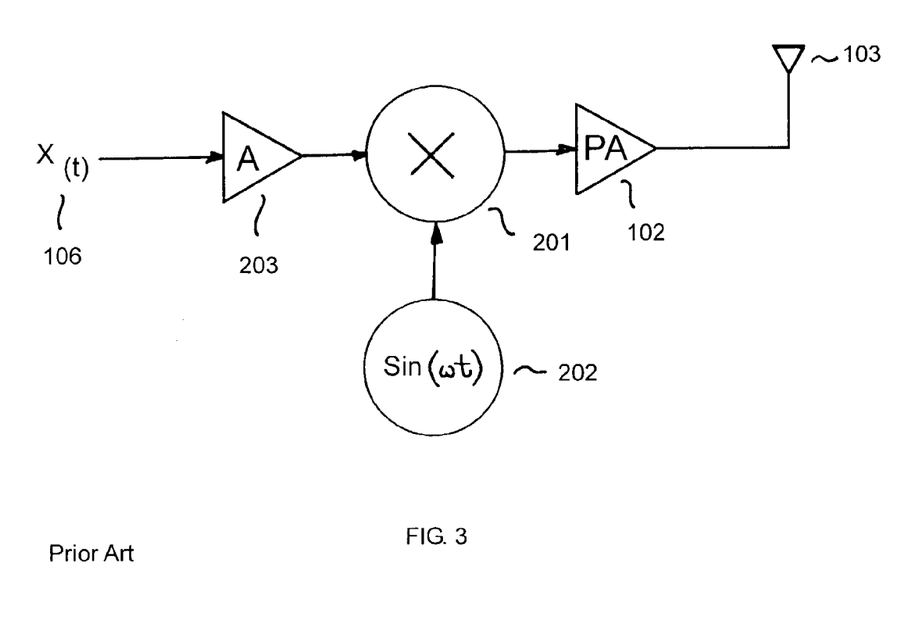
FIG. 3 is a block diagram of a direct up transmitter without carrier suppression according to the prior art.

The simplest practical form of direct conversion transmitter (conceptually shown in FIG. 2) according the prior art is shown in FIG. 3. Here, the modulating signal, x(t), is amplified by first amplifier A 203 and then mixed by mixer 201 with the local oscillator 202 signal Sin(ωt) to generate the in-phase component, and signal Cos(ωt) to generate the quadrature component. The output of mixer 201 is an RF signal modulated by x(t) 106 at the local oscillator frequency of $\left(\frac{\omega}{2\pi}\right)$.

PA 102 then amplifies the signal to the required transmit power.

First amplifier 203 and power amplifier 102 can be variable gain amplifiers. RF amplifier gain control is typically accomplished by adding a PIN diode variable attenuator to the amplifier section. Variable gain RF amplifiers are costly, difficult to design, and rarely can provide more than 40 dB of or RF isolation. It is far more effective to control the gain of the transmitter at relatively low baseband frequencies than at the RF output frequency.

Figure 4:
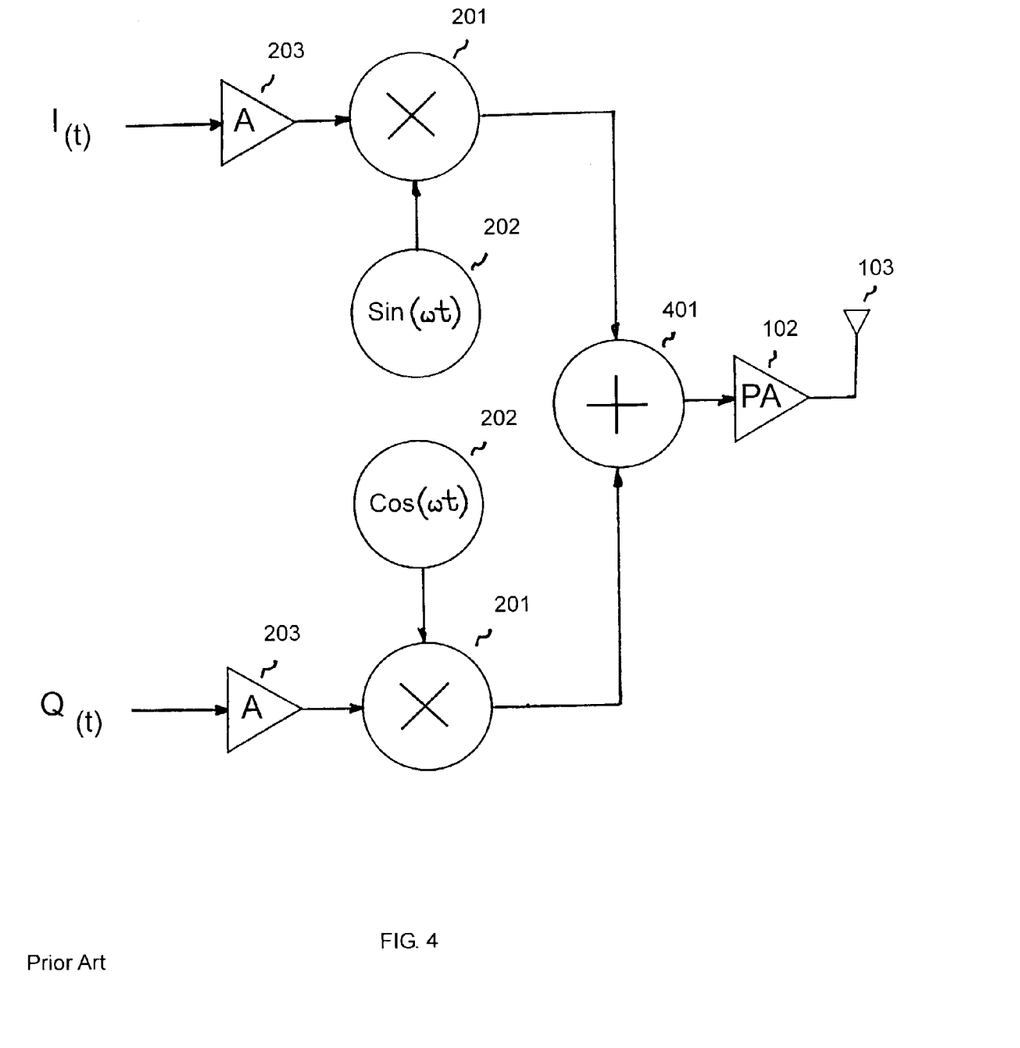
FIG. 4 is a block diagram of a direct up transmitter with carrier suppression according to the prior art.

FIG. 4 shows a more typical embodiment of the direct up scheme, still according to the prior art, a carrier suppressed transmitter. Here there are two direct conversion circuits, the local oscillators 202 have the same frequency, but are in quadrature, or 90° out of phase with each other. When two such modulated signals are added at summer 401, the resulting RF signal is a carrier suppressed transmission modulated by I(t) and Q(t) (both can be versions of the same x(t)). The combined RF signal is then amplified to the desired level by PA 102. PA 102 is typically of variable gain, and in modern wireless systems, such as many cellular systems, the PA 102 gain level is remotely commanded by a remote cell base station. The remote control of mobile unit power allows the base station to balance the field mobile units so that all received signals are of roughly the same power level.

Local Oscillator Leakage:

Using the topology of FIG. 4, with two local oscillators operating in quadrature, the amount of carrier suppression is a function of the leakage of both local oscillators through both mixers. The local oscillator leakage is predominantly caused by DC offsets in the mixers, and by second order errors in the mixer circuit, such as component parameter matching. The dominant cause of leakage for a given offset corrective current is temperature. Temperature varies as the ambient operating conditions changes. Changes in local oscillator leakage, caused by changes in ambient temperature, can be corrected by relatively slow adaptive loops that present a DC correction. The adaptive loop can generate a DC correction signal to correct for DC offsets at the mixer.

The suppression of local oscillator carrier leakage also allows for the wireless transmitter's gain to be set by adjusting the signal level of the modulating signal at the baseband frequency. This approach can provide precision wireless transmitter gain control and is far less costly, is more accurate, and has wider dynamic range then the variable gain amplifiers of the prior art comprising variable PIN attenuators.

Adaptive Correction:

The solution to the problem of maintaining an optimal leakage suppression current over time as well as for varying ambient conditions is to use an active means to monitor carrier frequency leakage. The monitored values can then be used to develop a corrective adaptive feedback that optimally minimizes the leakage. First the power at the carrier frequency must be measured, then correction currents are calculated based on the present measurement and the previously stored measurements, and finally the correction currents are generated and summed with the modulation signal x(t) at the baseband inputs.

Corrective signals without adaptive feedback are ineffective. The leakage correction can be made with a fixed DC current, but a one time adjustment (such as manual adjustment during production) is generally insufficient to achieve good suppression over variable operating conditions. This is because the leakage varies with temperature and time (aging of circuitry), and to a lesser extent, with output power level.

Figure 5:
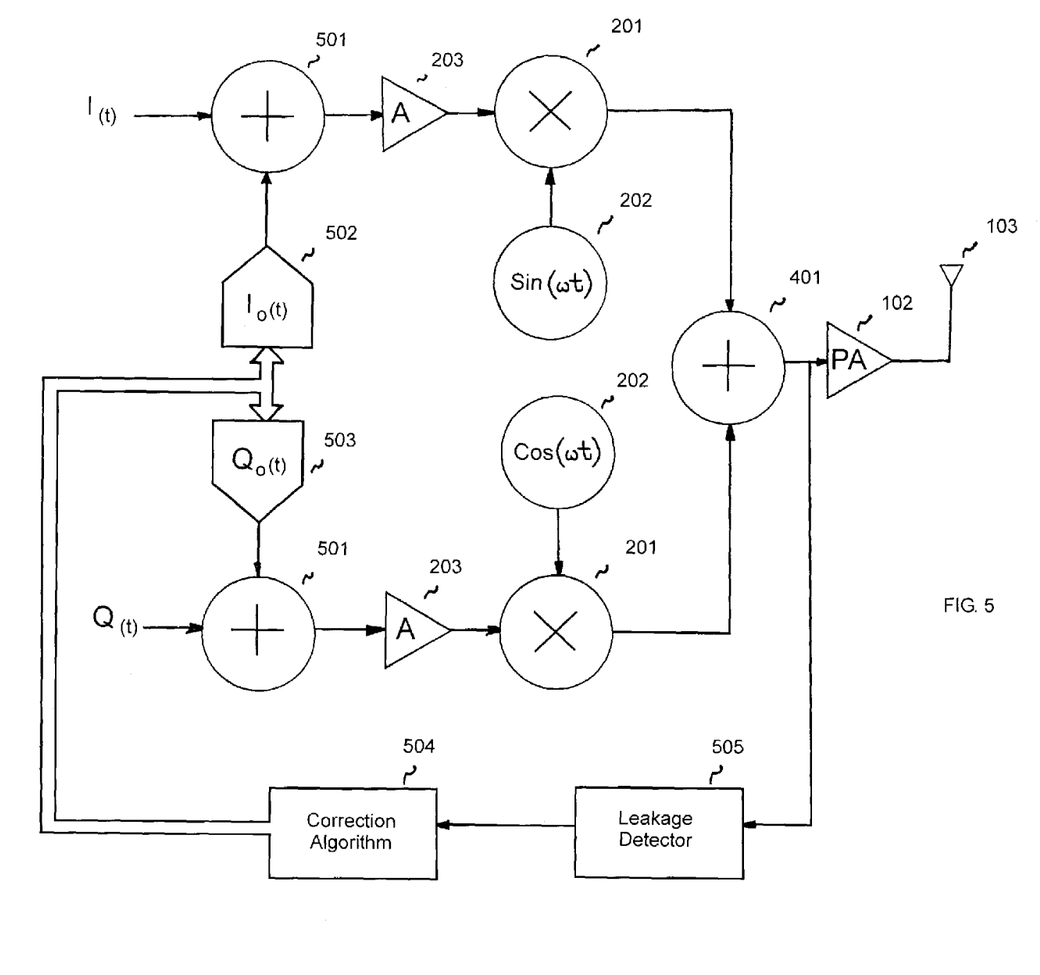
FIG. 5 shows a block diagram of a carrier suppressed direct up transmitter using the inventive carrier suppression technique.

FIG. 5 shows the carrier suppressed direct up transmitter topology of FIG. 4 employing an adaptive feedback system for the optimization of carrier suppression according to the inventive technique. A sample of the modulated RF signal, typically taken from before PA 102, is fed back to Leakage detector 505. The result of the leakage measurement is an input variable to the corrective algorithm 504. The corrective algorithm generates the most current digital values for carrier suppression and outputs these values to corrective digital to analog converters (DAC) 502 and 503. The corrective signals generated by the DACs are added to the in-phase modulating signal I(t) and the quadrature modulating signal Q(t) by adders 501. Modulation amplifiers 203 can be used to increase the level of the modulated signals prior to mixing in mixer 201. Alternatively, the corrective signal could be added to the modulating signal after amplifier 203 (not shown). Mixers 201 mix the modulating signals with the local oscillator 202 signals to generate the modulated quadrature signals. The modulated quadrature signals are summed at summer 401 and amplified by PA 102 for transmission by antenna 103.

Measurement of the carrier leakage power (leakage detector 505) can be accomplished in several ways. A narrow band filter can be incorporated such that the bandwidth of the filter is wide enough to detect the carrier frequency and yet narrow enough to reject the power in the sidebands. Alternatively, many direct up transmitters are a part of a transceiver and the receiver portion of the transceiver can be configured to 'receive' for leakage measurements during the transmit cycles. Digital signal processing (DSP) techniques, as known to those skilled in the art, can be used in firmware to determine the carrier power.

Figure 7:
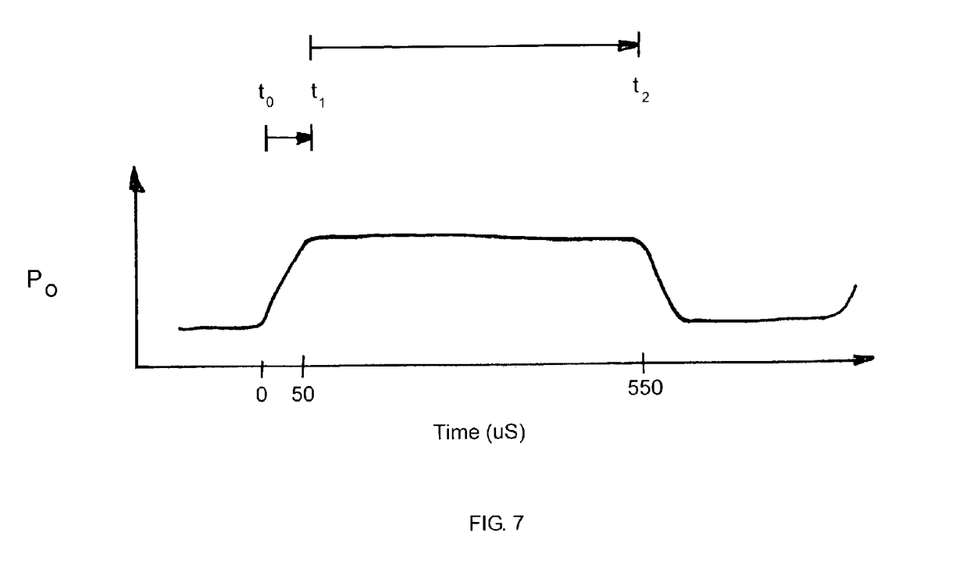
FIG. 7 shows a waveform in time of a data frame transmission.

In the simplest embodiment of the invention, the leakage is measured and compensated for every transmission cycle. Compensation is thus made fast enough to suppress leakage over the relatively slow changes in transmitter ambient temperature but, slower than the time period of a typical transmission cycle, such as one on the order of 600 µS wide as shown in FIG. 7.

Leakage measurements are made during a transmission cycle, that is the transmission of one data frame. A typical transmission format is a 600 µS wide data segment as shown in FIG. 7. Here, the power output typically ramps from zero power to full power in 50 µS, then transmits data for 500 µS, and finally ramps down for 50 µS. (In modulation theory, wide bandwidths can result from sharp modulation transitions, such as a squarewave, as compared to a smoother ramp transition. Here, the ramping technique is used avoid wide bandwidths that would occur if the transmitter were suddenly keyed on and off without the smooth ramp transitions between power levels.)

In this simplest correction form, a measurement of carrier power can made from $t_1$ to $t_2$ (FIG. 7) during the peak power output. Power measurements are all assumed to be average power measurements using standard numerical integration techniques as known to those skilled in the art. Here, the adaptive correction is determined and generated so as to minimize leakage during the time of data transmission. While this measurement timing scheme can be effective, it doesn't minimize carrier transmission during ramp up and ramp down. It may be further desirable to make the leakage measurement when the power output levels are lower during ramp up ($t_0$ to $t_1$), and, or ramp down. This is because at least to second order, the local oscillator leakage does depend on output power.

The cycle over which an adaptive correction is made is flexible and can be related to the method and period chosen for sampling leakage power. For example, in the simplest form of sampling as previously shown in FIG. 7, when a leakage power measurement is made from time $t_1$ to $t_2$, the correction algorithm can calculate and apply the correction currents $I_0$ and $Q_0$ in the time between data transmissions. In this case, each data transmission is made with the adaptive correction currents calculated from the preceding n data transmissions. The digital to analog converters (DAC) need only be fast enough to change and set output values in a time on the order of the rate of transmission of entire data frames.

Once the leakage power has been measured, the corrective adaptive feedback signals are developed. A gradient search algorithm is preferred, but other algorithms known in the art are useable as well. The gradient search algorithm perturbs a variable, here the corrective currents, notes the sign of the change in the measured value, here the transmitter leakage, then iterates a gentle correction before repeating the cycle. Using the gradient search technique, following a measurement cycle, the corrective currents are slewed in a direction and amount determined by the current leakage measurement as compared to the most recent n measurements and corrections. Over many cycles the algorithm adaptively 'learns' the magnitude and direction of the corrections to achieve incremental reductions in leakage power.

Alternatively, the adaptive corrections for each data frame can be made entirely on leakage measurements made during ramp up. In this case the corrections can be applied once per data frame as previously discussed. Or, leakage measurements can be made during ramp up and ramp down with corrections applied twice per data frame, once just before ramp up and then again just before ramp down.

In another embodiment, many measurements of leakage can be made during the transmission frame. The corrective currents can then be calculated as a function of time, a played back as a function of time during each transmission frame. In this case the new corrective function can be calculated each data frame and then played back in its latest adaptive form with each successive data transmission.

In this embodiment, there could be additional parameters taken into account and applied as feed forward corrections to the net adaptive corrective current function. For example, leakage power as a function of output power might be repeatable and well known. This can be due to transmitter self heating. The leakage as a function of transmitter power and time may be well known from design measurements. This function can be then computed as part of the corrective algorithm based on the commanded power level, as the power level requested by a base station. In this example, the corrections for self heating based on commanded transmitter power can be in the form of look up tables, or computed values based on formula reduced to code. Both can reside in firmware and be stored in physical memory such as ROM.

Figure 8:
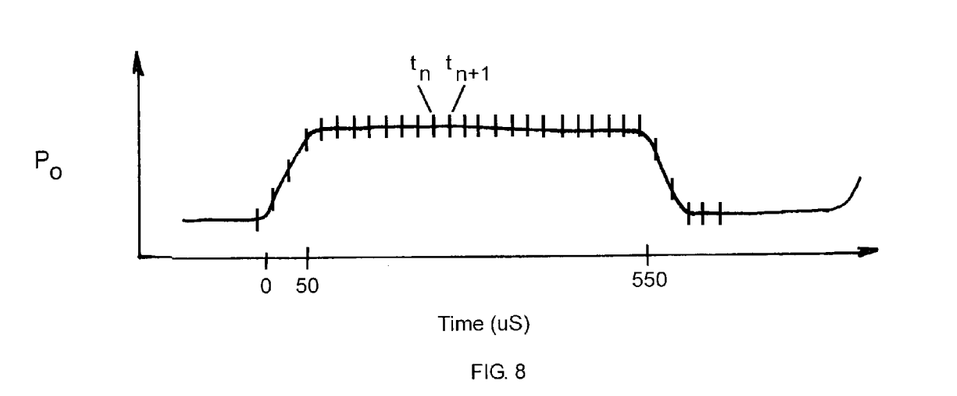
FIG. 8 shows a waveform in time of a data frame transmission where transmitter leakage is measured many times during a data frame transmission.

Another measurement scheme is show in FIG. 8. In this scheme many measurements are made during all parts of the transmission cycle, including power ramp up and ramp down. The time periods of measurement ($t_{n+1}-t_n$) can be made as small as practical in view of the speed of the leakage measurement sampling, measuring firmware and the speed of the corrective algorithm running on the processor. In this embodiment, the corrective signal can be a waveform that is a function of time and 'played' simultaneously with the modulating signal. Since wireless transmissions typically take the form of data frame transmissions, a corrective waveform is easily synchronized to a data frame using techniques well known in the art. This method of correction can advantageously compensate for changes in offset that occur during the transmission of a data frame. Temperature effects caused by self heating are again the predominant cause of changes in leakage during the cycle.

Here the corrective waveform can be calculated in several ways. The simplest solution is to 'feed forward' a typical know compensation as a function of time during the transmission frame. A feed forward correction can be based on laboratory measurements made with a particular type of transmitter for a given set of conditions and then implemented with a look up table. Alternatively, the corrective waveform can be solely calculated by the correction algorithm and continuously tuned by the algorithm on each correction calculation cycle for minimum leakage. Such a correction is typically calculated once for each transmission frame.

In the most sophisticated and costly embodiment, a new correction can be generated, immediately following each small sampled measurement of leakage current during each transmitted data frame. This algorithm can take into account learned patterns of transmission cycles to further refine the corrective current calculation for ramp up and ramp down times versus the relative steady state condition of the time during data transmission. This embodiment is most costly because, here not only is the computational DSP speed requirement higher, but also the corrective DACs now have to be capable of speeds many times higher than the rate of data frame transmissions.

In the most sophisticated technique, the offset correction is calculated virtually in real time, during the transmission of a data frame. Here, each successive value of the corrective waveform is calculated just prior to the DAC being set to that value. Using this technique the corrective waveform is calculated "on the fly". Since this technique is computationally very demanding only applications requiring the tightest leakage suppression performance would require this level of real time correction.

Where sufficient to yield adequate results, the preferred embodiment need only generate corrective currents as a function of time once per data transmission cycle. This solution gives the advantages of variable corrective action to minimize leakage during a cycle combined with the lower computational overhead since calculations need be completed only once per data frame transmission. On the other hand, where sufficient results can be achieved with a single valued corrective current over a data frame, this solution is most cost effective and least demanding of computational resources and DAC speed.

EXAMPLE

An experiment was conducted to as proof of principle of the inventive technique. An in-phase and quadrature direct up modulation topology transmitter was constructed using a Lucent Technologies/Agere W4050 wireless LAN transmitter operating at 2.4 GHz. Two DC correcting currents were established using Hewlett Packard power supplies as voltage references driving input resistors to both modulator baseband inputs. A spectrum analyzer was used to monitor the power of the desired data loaded RF transmission spectral components as compared to the undesired power at the carrier frequency resulting from local oscillator signal leakage. The two reference voltages were manually slewed to find minimums in the leaked local oscillator signals while observing the transmitter power output spectrum on the spectrum analyzer. The corrections were effective in achieving high ratios of up to 60 dB that lasted over periods of several seconds. The manual experiment proved the feasibility of an equivalent closed loop system, since the closed loop control algorithm would achieve regular adaptive corrections much faster, on the order of milliseconds.

We claim:

1. A direct conversion transmitter comprising:
   an in-phase local oscillator and a quadrature local oscillator to generate local oscillator signals, the in-phase local oscillator and a quadrature local oscillator electrically coupled to an in-phase mixer and a quadrature mixer;
   an in-phase modulating signal and a quadrature modulating signal electrically coupled to an in-phase summer and a quadrature summer, the in-phase modulating signal and quadrature modulating signal utilized to modulate the local oscillator signals;
   the in-phase mixer and a quadrature mixer for mixing the modulating signals with the local oscillator signals to generate a modulated in-phase signal and a modulated quadrature signal at the local oscillator frequency;
   a radio frequency (RF) combiner electrically coupled to the output of the in-phase mixer and the quadrature mixer, the RF combiner to combine the modulated in-phase signal and the modulated quadrature signal to generate a carrier suppressed modulated signal;
   a leakage detector electrically coupled to the output of the RF combiner, downstream of the RF combiner, the leakage detector measuring the magnitude of carrier signal in the carrier suppressed modulated signal during transmission;
   a correction algorithm processor electrically coupled to the leakage detector, the correction algorithm processor running a correction algorithm to calculate values utilized to generate an in-phase digital correction signal and a quadrature digital correction signal;
   an in-phase digital to analog converter (DAC) and a quadrature DAC electrically coupled to the in-phase and quadrature outputs of the correction algorithm processor, the in-phase DAC and the quadrature DAC controlled by the correction algorithm processor, the in-phase digital to analog converter (DAC) and quadrature DAC generating an in-phase corrective signal and a quadrature corrective signal;
   the in-phase summer and quadrature summer electrically coupled to the in-phase mixer and a quadrature mixer, the in-phase summer and quadrature summer for adding the in-phase corrective signal and the quadrature corrective signal to the in-phase modulating signal and the quadrature modulating signal, respectively, before the signals are mixed; and
   an antenna to transmit the carrier suppressed modulated signal, wherein the in-phase correction signal and the quadrature correction signal are electrical currents, and wherein the magnitude of the carrier signal is measured at least once per data frame, and the in-phase correction signal and quadrature correction signal are calculated once per data frame.

2. The direct conversion transmitter of claim 1 wherein the magnitude of the carrier signal is measured a plurality of times during the transmission of a data frame.

3. The direct conversion transmitter of claim 2 wherein the in-phase correction signal and quadrature correction signal waveforms generated by the in-phase digital to analog converter (DAC) and the quadrature DAC are a waveform, synchronized to the data frame, that is a function of time.

4. A direct conversion transmitter comprising:
   an in-phase local oscillator and a quadrature local oscillator to generate local oscillator signals, the in-phase local oscillator and a quadrature local oscillator electrically coupled to an in-phase mixer and a quadrature mixer;
   an in-phase modulating signal and a quadrature modulating signal electrically coupled to an in-phase summer and a quadrature summer, the in-phase modulating signal and quadrature modulating signal utilized to modulate the local oscillator signals;
   the in-phase mixer and a quadrature mixer for mixing the modulating signals with the local oscillator signals to generate a modulated in-phase signal and a modulated quadrature signal at the local oscillator frequency;
   a radio frequency (RF) combiner electrically coupled to the output of the in-phase mixer and the quadrature mixer, the RF combiner to combine the modulated in-phase signal and the modulated quadrature signal to generate a carrier suppressed modulated signal;
   a leakage detector electrically coupled to the output of the RF combiner, downstream of the RF combiner, the leakage detector measuring the magnitude of carrier signal in the carrier suppressed modulated signal at least once per data frame during transmission;
   a correction algorithm processor electrically coupled to the leakage detector, the correction algorithm processor running a correction algorithm to calculate values utilized to generate an in-phase digital correction signal and a quadrature digital correction signal;
   an in-phase digital to analog converter (DAC) and a quadrature DAC electrically coupled to the in-phase and quadrature outputs of the correction algorithm processor, the in-phase DAC and the quadrature DAC controlled by the correction algorithm processor, the in-phase digital to analog converter (DAC) and quadrature DAC generating an in-phase corrective signal and a quadrature corrective signal;
   the in-phase summer and quadrature summer electrically coupled to the in-phase mixer and a quadrature mixer, the in-phase summer and quadrature summer for adding the in-phase corrective signal and the quadrature corrective signal to the in-phase modulating signal and the quadrature modulating signal, respectively, before the signals are mixed; and
   an antenna to transmit the carrier suppressed modulated signal, wherein the correction algorithm comprises a gradient search algorithm.

5. The direct conversion transmitter of claim 4 wherein the direct conversion transmitter is used in a wireless transmitter application.

6. The direct conversion transmitter of claim 4 wherein the wireless transmitter is a mobile telephone.

7. The direct conversion transmitter of claim 4 wherein the wireless transmitter is a component of a wireless data network.

8. The direct conversion transmitter of claim 4 wherein the wireless data network is a local area network (LAN).

9. A direct conversion transmitter comprising:
   an in-phase local oscillator and a quadrature local oscillator to generate local oscillator signals, the in-phase local oscillator and a quadrature local oscillator electrically coupled to an in-phase mixer and a quadrature mixer;

an in-phase modulating signal and a quadrature modulating signal electrically coupled to an in-phase summer and a quadrature summer, the in-phase modulating signal and quadrature modulating signal utilized to modulate the local oscillator signals;

the in-phase mixer and a quadrature mixer for mixing the modulating signals with the local oscillator signals to generate a modulated in-phase signal and a modulated quadrature signal at the local oscillator frequency;

a radio frequency (RF) combiner electrically coupled to the output of the in-phase mixer and the quadrature mixer, the RF combiner to combine the modulated in-phase signal and the modulated quadrature signal to generate a carrier suppressed modulated signal;

a leakage detector electrically coupled to the output of the RF combiner, downstream of the RF combiner, the leakage detector measuring the magnitude of carrier signal in the carrier suppressed modulated signal during transmission;

a correction algorithm processor electrically coupled to the leakage detector, the correction algorithm processor running a correction algorithm to calculate values utilized to generate an in-phase digital correction signal and a quadrature digital correction signal;

an in-phase digital to analog converter (DAC) and a quadrature DAC electrically coupled to the in-phase and quadrature outputs of the correction algorithm processor, the in-phase DAC and the quadrature DAC controlled by the correction algorithm processor, the in-phase digital to analog converter (DAC) and quadrature DAC generating an in-phase corrective signal and a quadrature corrective signal;

the in-phase summer and quadrature summer electrically coupled to the in-phase mixer and a quadrature mixer, the in-phase summer and quadrature summer for adding the in-phase corrective signal and the quadrature corrective signal to the in-phase modulating signal and the quadrature modulating signal, respectively, before the signals are mixed; and an antenna to transmit the carrier suppressed modulated signal, wherein the magnitude of the carrier signal is measured at least once per data frame.

* * * * *